April 23, 1957  A. A. GRABAU ET AL  2,789,809
SEALING MEANS FOR SINTERING MACHINES OR THE LIKE
Filed March 26, 1956  3 Sheets-Sheet 1

INVENTORS
ALEXANDER A. GRABAU
& CONRAD HERRE.
BY
Bosworth, Sessions
Herrstrom & Lawler
ATTORNEYS

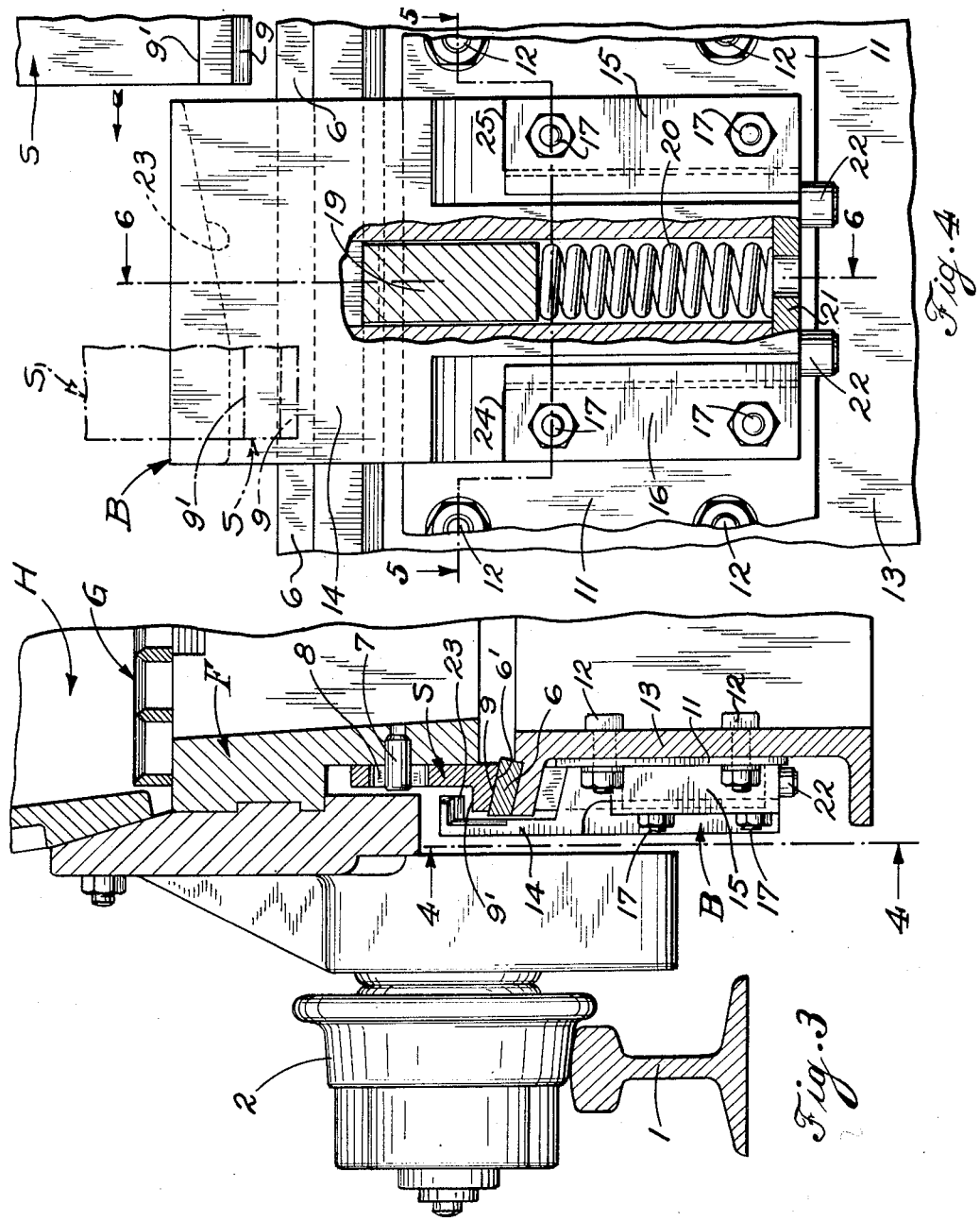

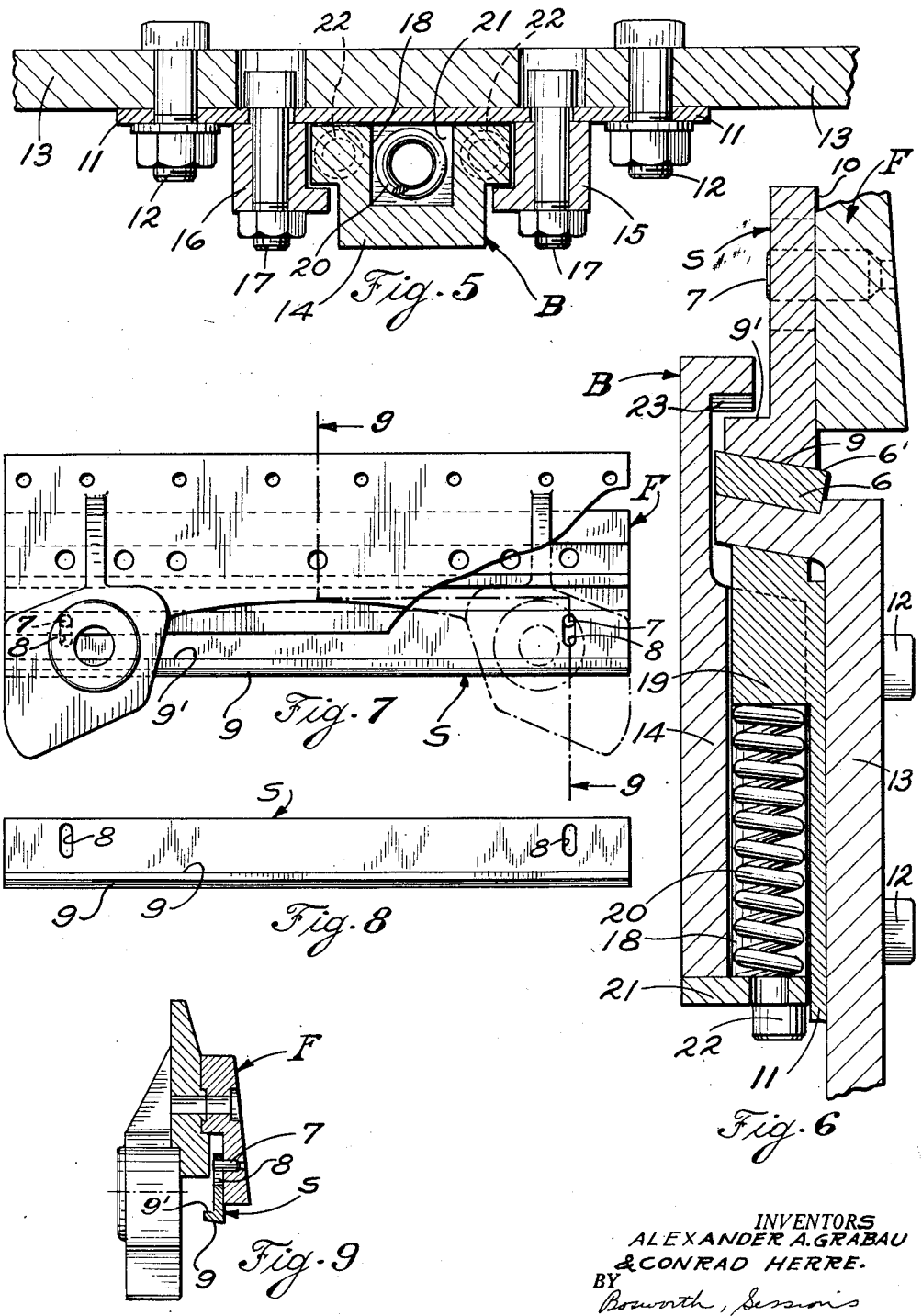

United States Patent Office 2,789,809
Patented Apr. 23, 1957

2,789,809
SEALING MEANS FOR SINTERING MACHINES OR THE LIKE

Alexander A. Grabau and Conrad Herre, Cleveland, Ohio, assignors to Arthur G. McKee & Company, Cleveland, Ohio, a corporation of Delaware Application March 26, 1956, Serial No. 573,931

7 Claims. (Cl. 266—21)

This invention relates to apparatus for providing an air or gas seal between a movable container or the like and an enclosed structure disposed below the path of travel thereof, and more particularly to improved means for preventing leakage between the moving pallets of a continuous sintering machine or the like as they travel over a wind box disposed therebelow.

In an extensively used type of continuous machine for the sintering or other heating of metallic ores, concentrates, blast furnace flue dust, etc., a series of pallets are moved in abutting relation along a pair of tracks, each pallet having suitable wheels at its opposite ends for supporting the pallet on the tracks. It is well known in this type of apparatus to provide one or more wind boxes below the tracks to facilitate the movement of air or other gas through the material carried in the pallets. To prevent leakage of gas between the wind box and the lower portions of the pallets moving thereover, seal bars or plates have been mounted on the opposite ends of each pallet in vertical alignment with, and above, seal slides which extend parallel to the pallet supporting tracks and define the opposite upper edges of the wind box. These seal bars are supported on the ends of the pallets to travel longitudinally therewith but to have limited vertical movement toward and away from the seal slides. The forward ends of the seal slides are depressed somewhat below the lowermost position of the seal bars so that the bars ride up on the slides as the pallets advance toward the wind box. As the pallets travel over the wind box the seal bars slide along on the seal slides, being held in contact therewith by gravity, and form a sliding seal between the pallets and the wind box which is effective to prevent undesired leakage to or from atmosphere. At the end of the travel of the pallets over the wind box the seal bars leave the seal slides and drop down to their lowermost positions.

During the return movement of the pallets in this type of continuous sintering or heat treating machine they are inverted and the seal bars move by gravity to their uppermost positions. In some instances, due to accumulation of dirt or for other causes, a seal bar will stick or hang in its uppermost position. When this occurs the stuck or hung-up seal bar will be spaced above the seal slide permitting leakage of air or gas therebetween as the pallet moves across the wind box.

It is an object of the present invention to provide means for eliminating the difficulties caused by the sticking or hanging of seal bars in continuous sintering machines or the like, and thus to maintain at all times a complete and effective sliding seal between the pallets and the wind boxes. Other objects of our invention include the provision of seal bar pull-down means for effectively freeing seal bars which may have stuck in a position where they would not properly contact the seal slides; the provision of seal bar pull-down means whereby damage to the apparatus is prevented in case a hung-up seal bar resists freeing to a degree beyond a predetermined point; and the provision of a rugged, economically constructed apparatus for insuring proper contact between the seal bars and seal slides of a continuous sintering machine or the like with a minimum of maintenance or attention.

The above and other objects of our invention will appear from the following description of one embodiment thereof, reference being had to the accompanying drawings in which:

Figure 3 is an enlarged vertical cross-sectional view taken substantially on line 3—3 of Figure 1 and showing, in addition to the elements shown in Figure 2, the seal bar pull-down device, the seal bar proper being illustrated in sliding sealing engagement with the seal slide.

Figure 4 is a detached fragmentary elevational view, with certain parts broken away, of our seal bar pull-down unit and illustrating the position of a hung-up seal bar relative thereto as the seal bar approaches the pull-down unit.

Figure 5 is a horizontal cross-sectional view taken substantially on line 5—5 of Figure 4.

Figure 6 is a vertical cross-sectional view taken substantially on line 6—6 of Figure 4.

Figure 7 is an end elevation of the frame structure of one of the pallets, with one of our improved seal bars supported thereon and disposed in its lowermost position.

Figure 8 is a detached side elevational view of one of our improved seal bars.

Figure 9 is a vertical cross-sectional view taken substantially on line 9—9 of Figure 7.

Figure 1:
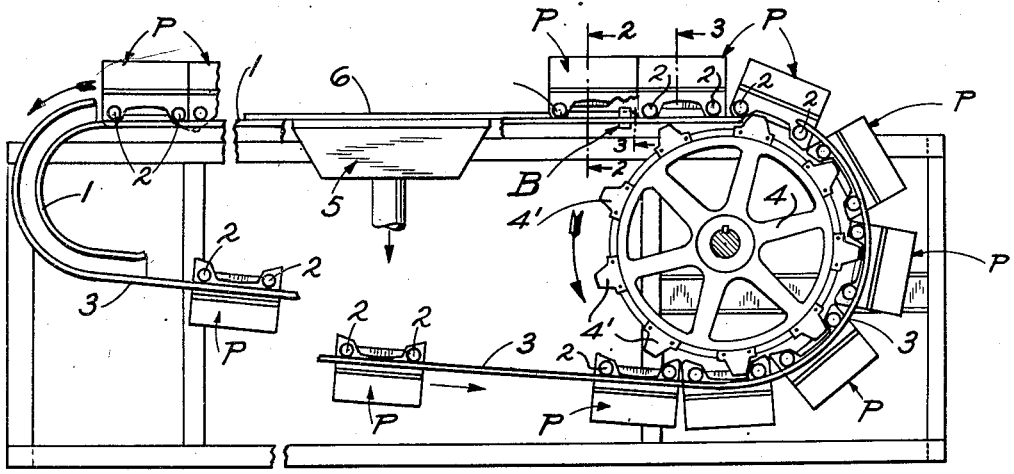
Figure 1 is a diagrammatic side elevation of a continuous sintering machine with our improved seal bar pull-down means incorporated therein.
Figure 2:
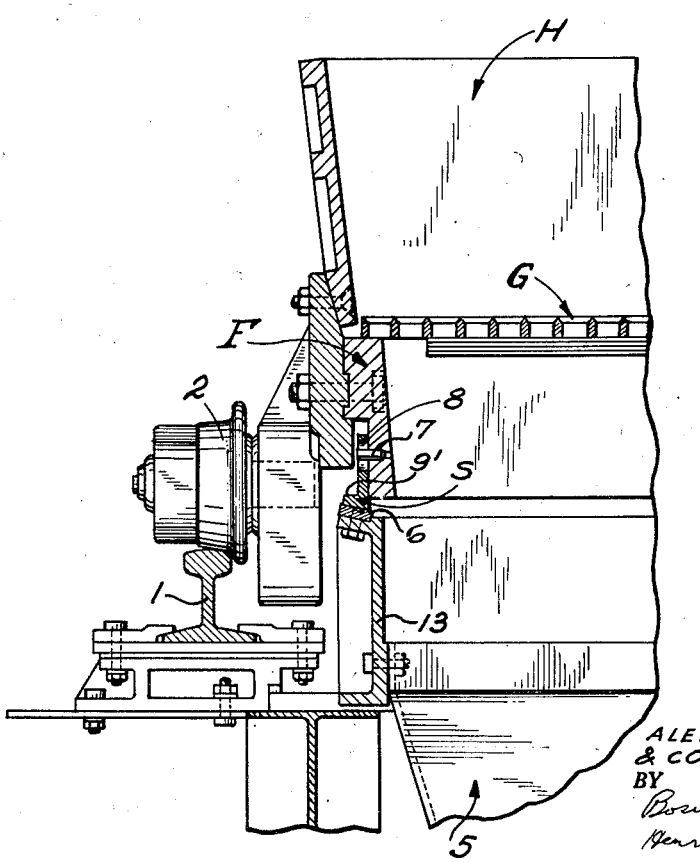
Figure 2 is an enlarged vertical cross-sectional view taken substantially on line 2—2 of Figure 1 and illustrating one end of one of the movable pallets, the wind box disposed therebelow, and a seal bar supported on the end of the pallet.

A sintering machine or the like of a type with which our improved sealing means is adapted to be employed is diagrammatically illustrated in Figure 1. The apparatus includes a pair of rails or tracks 1 (only one track being seen in the elevational view) extending horizontally and adapted to support a series of pallets P as they are moved thereacross in abutting relation. Each of the pallets P includes a frame section F (see Figure 2), a receptacle or hopper portion H and a grate G. A pair of wheels 2 is supported on the frame F of each pallet at the opposite ends thereof and each pair of wheels runs on one of the parallel tracks 1 as the pallets move horizontally across the top of the machine from right to left as seen in Figure 1.

At the discharge end of the machine the tracks 1 curve downwardly and a second pair of tracks 3 are aligned with but spaced radially from the tracks 1 to form a guide for the wheels of the pallets. Thus as each pallet reaches the discharge end of the machine it is inverted and passes in upside down position down the inclined lower reach of the tracks 3 until it reaches the large driven sprocket wheel 4. As this sprocket rotates the lugs 4' thereon engage suitable abutment portions on each pallet and move them around the periphery of the wheel while the pallets are held thereagainst by the extended portion of the tracks 3. After a pallet reaches track 1 it is pushed therealong by the succeeding pallets which are in turn driven by the sprocket wheel 4.

A wind box 5 is illustrated disposed below the tracks 1 and suitable means, such as a fan or the like, are provided to create a draft upwardly or downwardly, as desired, through the wind box. Thus when a pallet P is traveling across over the wind box 5 atmosphere will be drawn down or forced up through the charge in the hopper H and the grate G of the pallet.

To prevent undesirable leakage between the top longitudinal edges of the wind box 5 and the end portions of the pallets as they move thereacross a pair of seal slide members 6 are suitably supported at the top edge portions of the wind box 5 adjacent and parallel to the tracks 1. These seal slides 6 extend somewhat ahead of the advance (right-hand) end of the wind box and each pallet has supported at each end thereof a seal bar member generally indicated at S.

As best seen in Figures 2, 7, 8, and 9, these seal bars are of the same length as the ends of the frame portions F of the pallets P and are supported thereon on spaced pins 7 which project into vertically elongated slots 8 in the seal bars. Thus each seal bar will move longitudinally with the pallet on which it is mounted but may have limited vertical movement relative thereto. The bottom inclined sealing face 9 of each seal bar is adapted to engage and slide upon the correspondingly inclined upper face 6' of the seal slides 6 (see Figure 3), thus forming a substantially gas-tight seal between the ends of the pallets and the wind box as the pallets move thereacross. The inward inclination of the sealing faces 9 and 6' tend to cause the inner side faces 10 (Figure 6) of the seal bars S to remain in close engagement with the adjacent outer face of the wall of the pallet frame F and maintain a substantially gas-tight relation there-between.

The seal bar supporting pins 7 are so disposed that when the seal bars S are sliding on the seal slides 6 the pins 7 will be spaced from the ends of the slots 8 in the seal bars as seen in Figure 3. When a pallet moves beyond the end (left-hand in Figure 1) of the seal slide 6 the seal bars S will normally drop down until the tops of the slots 8 engage the pins 7 as seen in Figure 9. However when the pallet is turned upside down and is traveling along the lower tracks 3 to return to the sprocket wheel 4, the seal bars normally will drop down and be supported on the pins 7 on what are the bottom ends of the slots 8 when the pallets are upright. As the pallets are moved around the sprocket wheel 4 and return to upright position the seal bars normally drop back down into the position shown in Figure 9 and, in order to facilitate engagement of the seal bars with the seal slides 6 the entering ends thereof are preferably depressed to permit the seal bars to slide up into sealing position thereon.

In the normal operation of the above described apparatus the seal bars have a floating support on the seal slides as they travel thereacross and are held in engagement therewith by their own weight. However, in some instances, and for various reasons such as accumulation of dirt or the like in the slots 8, a seal bar may, while the pallet is inverted during its movement along the lower tracks 3, become stuck in an elevated position. If this occurs, and in the absence of our present invention, the seal bar will not engage the seal slide 6 as it moves thereover but will be spaced thereabove, thus permitting atmosphere to leak to or from the wind box as the case may be. This leakage will of course change the flow through the pallet grates with undesirable results on the sintering or other operation being carried out therein.

In order to eliminate the possibility of a seal bar being stuck or hung-up and to insure proper sealing engagement of the seal bars with the seal slides at all times we provide seal bar pull-down devices, generally indicated at B on Figure 1 (it being understood of course that there are a pair of the seal bar units B one mounted adjacent one seal slide 6 and the other adjacent the other seal slide 6). Referring particularly to Figures 3 and 6, it is seen that the lower sealing portion of the seal bars S is in the form of a flange or angle section the upper face 9' of which projects outwardly from the body portion of the seal bar and it is the faces 9' on the seal bars S which coact with the seal bar pull-down units to insure proper sealing engagement of the faces 9 of the seal bars with the seal slides 6.

As best seen in Figures 3 to 6 the seal slide units B each include a base plate 11 which is rigidly secured by bolts 12 to the stationary support member 13 which also may support the wind box 5. A cam member, generally indicated at 14, is supported on the base plate 11 for limited vertical sliding movement relative thereto by the guide-way members 15 and 16 which are secured to the base plate 11 as by bolts 17. The portion of the cam member 14 which slides in the guide-ways 15 and 16 is formed with rectangular slot 18 extending throughout its length. A generally rectangular projection or abutment 19 on the base 11 is disposed within the slot 17 when the parts are assembled and a spring 20 extends between the lower end of the abutment 19 and a bottom plate 21 which is secured to the lower end of the cam member 14 by screws 22 and forms a closure for the lower end of the slot 18.

The spring 20 is normally under pre-compression and tends to urge the cam member 14 downwardly relative to the stationary base plate 11. Stop faces 24 and 25 are provided on the cam member 14 and normally engage the upper ends of the guide way members 15 and 16 respectively (see Figure 4) thus limiting the downward movement of the cam member 14 under the influence of the spring 20.

The upper portion of the cam member 14 is cut away or offset so that when the pull-down unit B is secured to the frame member 13 it will extend upwardly outside of but closely adjacent the seal slide 6 to a point above the sealing face 6' thereof (see Figures 3 and 6). At the upper end of cam member 14, and overlying but vertically spaced from the sealing face 6' of the seal slide 6, is an inclined cam face 23. The advance or entering end of this inclined cam face 23 is spaced farther from the sealing face 6' of the seal slide 6 than is its trailing end.

The advance end of a seal bar S is illustrated in stuck or hung-up position in Figure 4. In this condition the upper face 9' of the seal bar flange portion is disposed to engage the inclined cam face 23 which will act thereagainst to pull the seal bar down and free same on its supporting pins 7, thus permitting it to drop by gravity into proper sliding sealing engagement with the upper face of the seal slide 6. As seen in phantom lines in Figure 4 a seal bar S which is not "hung-up" will slide along on the seal slide 6 and its face 9' will not engage the seal bar pull-down cam. Thus normal operation of the apparatus is not in any way interfered with but, in the event of the sticking or hanging of a seal bar it will automatically be cammed down into sealing position.

As previously described the cam member 14 is supported for sliding vertical movement relative to the base plate 11 and the spring 20 normally holds the cam member 14 in its lowermost position (seen in Figure 4). The spring 20 is made sufficiently heavy and is so installed that, in normal operation and with ordinary sticking of the seal bars, the cam member 14 will remain in its lowermost position. However if a seal bar in some manner gets jammed or stuck so tightly in its uppermost position that engagement with the cam face 23 might cause breakage or other damage before the seal bar was freed, the spring 20 will yield permitting the cam face 23 to lift and the seal bar to slide through. Although in this event the seal bar will not be moved down into sealing contact with the seal slide, breakage or other injury will be prevented and thus the safety spring 20 is effective in maintaining the seal bar pull-down units operative to free all normally stuck seal bars but to yield and prevent damage under abnormal or unusual conditions.

Although we have described the illustrated embodiment of our invention in considerable detail, it will be understood that variations and modifications may be made in the form and arrangement of our improved seal bar mechanism. Accordingly we do not wish to be limited to the exact structures shown and described but claim as our invention all embodiments thereof coming within the appended claims.

We claim:

1. In apparatus of the type described, a pair of tracks, a plurality of pallets having bottom grate portions and adapted to be moved along said tracks, means for causing gas to move through said grate portions of said pallets including a wind box below said tracks, a pair of seal slides extending parallel to said tracks at the upper side edges of said wind box, seal bars supported at opposite ends of said pallets for limited vertical movement, said seal bars having sealing faces and cam engaging portions and being disposed with said sealing faces in vertical alignment with said seal slides as said pallets move along said tracks, and seal bar pull-down cams disposed ahead of said wind box in the paths of said seal bars on the opposite ends of said pallets, said cam engaging portions of said seal bars being positioned, when said seal bars approach said cams with their sealing faces more than a predetermined distance above said seal slides, to engage said pull-down cams and move said sealing faces toward said seal slides.

2. In apparatus of the type described, a pair of tracks, a plurality of pallets having bottom grate portions and adapted to be moved along said tracks, means for causing gas to move through said grate portions of said pallets including a wind box below said tracks, a pair of seal slides extending parallel to said tracks at the upper side edges of said wind box, seal bars supported at opposite ends of said pallets for limited vertical movement, said seal bars having sealing faces and cam engaging portions and being disposed with said sealing faces in vertical alignment with said seal slides as said pallets move along said tracks, seal bar pull-down cams disposed ahead of said wind box in the paths of said seal bars on the opposite ends of said pallets, said cam engaging portions of said seal bars being positioned, when said seal bars approach said cams with their sealing faces more than a predetermined distance above said seal slides, to engage said pull-down cams and move said sealing faces toward said seal slides, and means for resiliently supporting said pull-down cams against upward movement when engaged by said seal bars.

3. Apparatus for providing a gas seal between a movable container and an enclosed structure disposed therebelow, said container being supported for movement relative to said structure, comprising, a seal slide member on said enclosed structure and extending parallel to the direction of movement of said container, a seal bar member, means for supporting said seal bar member on said movable container for longitudinal travel therewith and limited vertical movement relative thereto, said seal bar being disposed in vertical alignment with said seal slide member and adapted to have sliding sealing engagement therewith as said container moves over said enclosed structure, and cam means disposed in the path of travel of said seal bar member in advance of said enclosed structure and at an elevation such that said seal bar member, when a predetermined distance above said seal slide, will engage said cam means and be moved downwardly toward said seal slide.

4. A seal bar pull down for continuous sintering machines or the like having a movable pallet, a wind box below the path of travel of said pallet, a seal slide member secured to said wind box and having a sealing face extending in the direction of said path of travel of said pallet, and a seal bar having a sealing face and carried by and movable with said pallet along said path of travel, said seal bar being adapted to have limited vertical movement and said sealing face thereof being disposed in vertical alignment with said sealing face of said seal slide as said pallet moves across said wind box, comprising a cam member supported in fixed relation to said wind box in advance thereof in said path of travel of said pallet and seal slide, said cam member having a camming face disposed above said seal slide and inclined downwardly in the direction of travel of said pallet, said camming face being disposed to engage a portion of said seal bar, when said sealing face of said seal bar is disposed at least a predetermined distance above said sealing face of said seal slide, and move said seal bar downwardly toward said seal slide.

5. A seal bar pull-down for continuous sintering machines or the like having a movable pallet, a wind box below the path of travel of said pallet, a seal slide member secured to said wind box and having a sealing face extending in the direction of said path of travel of said pallet, and a seal bar having a sealing face and carried by and movable with said pallet along said path of travel, said seal bar being adapted to have limited vertical movement and said sealing face thereof being disposed in vertical alignment with said sealing face of said seal slide as said pallet moves across said wind box, comprising a cam member supported in fixed relation to said wind box in advance thereof in said path of travel of said pallet and seal slide, said cam member having a camming face disposed above said seal slide and inclined downwardly in the direction of travel of said pallet, said camming face being disposed to engage a portion of said seal bar, when said sealing face of said seal bar is disposed at least a predetermined distance above said sealing face of said seal slide, and move said seal bar downwardly toward said seal side, and a support for said cam member including guide means adapted to restrain said cam member against movement in the direction of travel of said pallet and permit vertical movement thereof, yieldable resilient means for urging said cam member downwardly in said guide means, and stop means for limiting said downward movement of said cam member.

6. A seal bar pull-down unit for continuous sintering machines or the like comprising a base plate, a cam support member, means for supporting said cam support on said base plate for sliding movement relative thereto, cooperating stop means on said base plate and said cam support member for limiting said sliding movement of said cam support in one direction, resilient means effective between said base plate and cam support member and adapted to oppose movement of said cam support member in the opposite direction, and a cam member carried by said cam support member and having a camming face extending in a direction generally normal to the direction of said sliding movement of said cam support member.

7. In combination in a continuous sintering machine or the like having a seal slide, a plurality of pallets, and seal bars supported on said pallets for limited vertical movement relative thereto, seal bar pull down apparatus supported on said sintering machine adjacent said seal slide and including a base plate, a cam support member, means for supporting said cam support on said base plate for sliding movement relative thereto, cooperating stop means on said base plate and said cam support member for limiting said sliding movement of said cam support in one direction, resilient means effective between said base plate and cam support member and adapted to oppose movement of said cam support member in the opposite direction, and a cam member carried by said cam support member and having a camming face extending in a direction generally normal to the direction of said sliding movement of said cam support member, said camming face being disposed in the path of travel of said seal bars as they approach said seal slide and positioned to engage said seal bars and move them downwardly when said seal bars are disposed above a predetermined point in their said limited vertical movement.

References Cited in the file of this patent

UNITED STATES PATENTS

| | | |
|---|---|---|
| 1,880,146 | Morison | Sept. 27, 1932 |
| 1,197,199 | Gayley | Sept. 5, 1916 |

FOREIGN PATENTS

| | | |
|---|---|---|
| 679,009 | Great Britain | Sept. 10, 1952 |